United States Patent [19]

Johnson

[11] 4,157,200
[45] Jun. 5, 1979

[54] ROAD DEBRIS DEFLECTOR FOR BOAT TRAILERS AND OTHER TOWING VEHICLES

[76] Inventor: Jarold W. Johnson, 7927 McGroarty, Sunland, Calif. 91040

[21] Appl. No.: 827,712

[22] Filed: Aug. 25, 1977

[51] Int. Cl.² ............................................. B62D 35/00
[52] U.S. Cl. ........................................ 296/1 S; 9/1.2; 280/414 R; 296/91
[58] Field of Search ......................... 296/1 R, 1 S, 91; 280/414 R, 154.5 R; 9/1.2

[56] References Cited

U.S. PATENT DOCUMENTS

| | | | |
|---|---|---|---|
| 3,339,217 | 9/1967 | Gudmundson | 9/1.2 |
| 3,528,095 | 9/1970 | Gudmundson | 280/414 R |
| 3,539,066 | 11/1970 | Stevenson | 280/414 R |

Primary Examiner—Joseph F. Peters, Jr.
Assistant Examiner—John A. Carroll
Attorney, Agent, or Firm—Gary Appel

[57] ABSTRACT

A deflector for attaching to forward portions of an open frame boat trailer to deflect road debris thrown rearwardly from the wheels of a vehicle towing the trailer comprises a generally trapezoidally-shaped deflecting member, major portions of which are flat. A forward edge portion of the member, which forms the shorter of the parallel sides of the trapezoid, is inclined upwardly and forwardly; whereas, an opposite rearward edge portion is inclined downwardly and rearwardly. Swept back side edges are inclined upwardly and generally outwardly and forwardly. The flat portion of the member rests upon, and is attached to, generally longitudinal beams of the trailer. The deflector is positioned rearwardly of the trailer hitching portion and extends rearwardly to beneath upswept bow portions of a boat carried on the trailer. The inclined edge portions of the deflector increase deflection efficiency while minimizing deflector size, and also add rigidity to the deflector. The deflector whose size and shape is relatively independent upon the type of trailer and type of boat to be carried on the trailer may be attached to existing trailers or built onto new trailers during manufacture.

3 Claims, 6 Drawing Figures

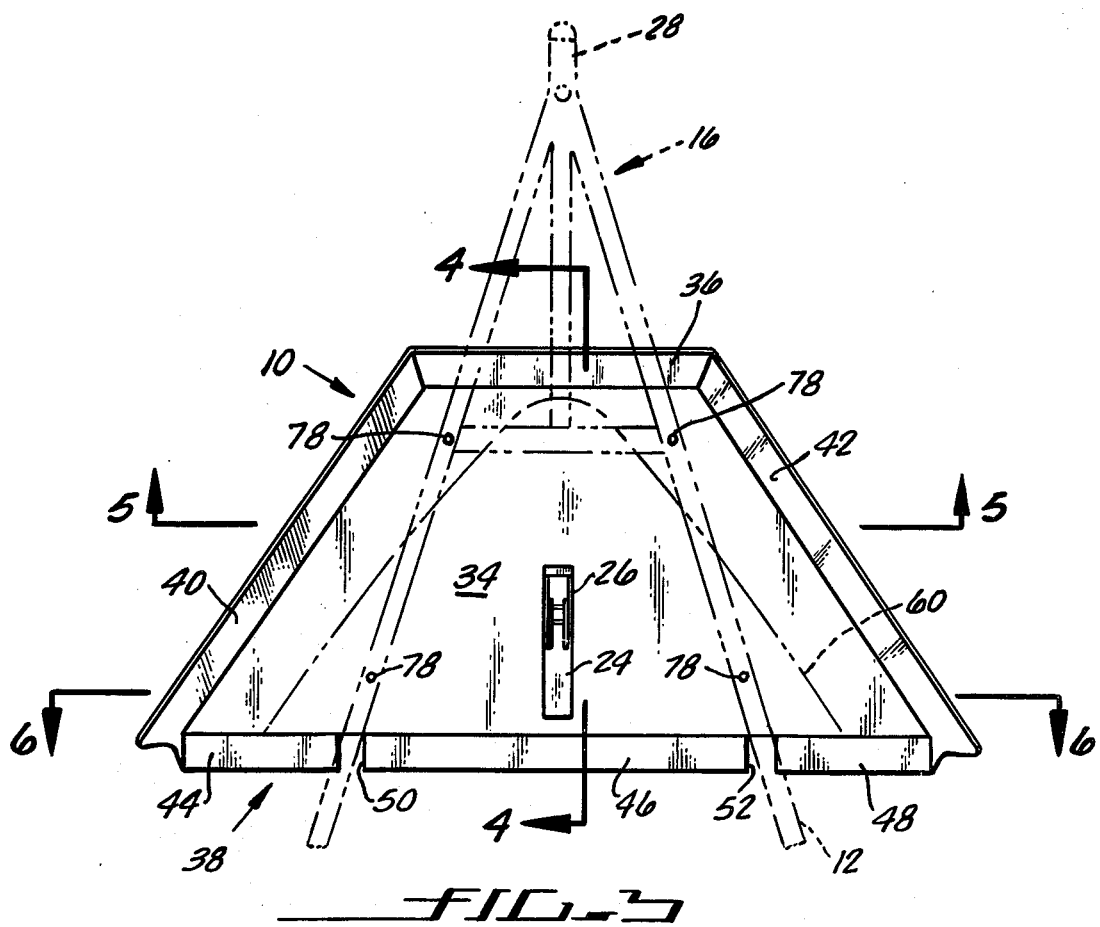
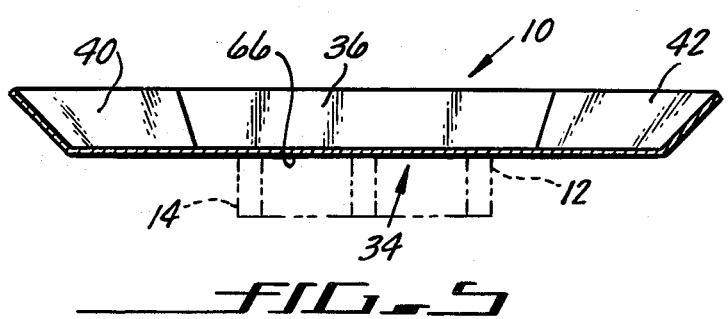
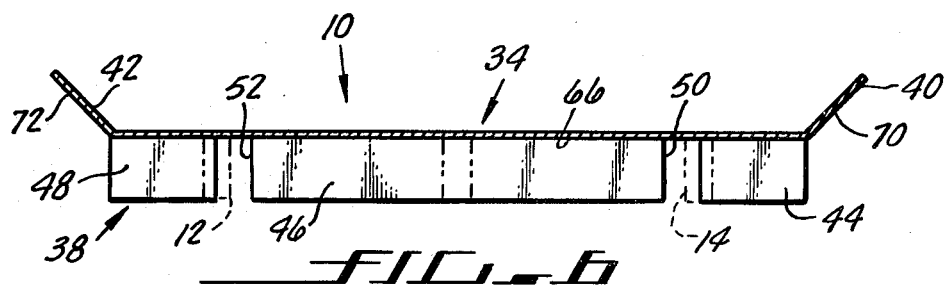

ROAD DEBRIS DEFLECTOR FOR BOAT TRAILERS AND OTHER TOWING VEHICLES

BACKGROUND OF THE INVENTION

1. Field of the Invention

The present invention relates generally to the field of boat trailers, and more particularly to debris deflectors associated with such trailers for protecting boats on the trailers from damage caused by gravel, stones, etc. thrown rearwardly by wheels of vehicles towing the trailers.

2. Discussion of the Prior Art

In keeping with the ever increasing popularity of small boats for recreational purposes, various types of boat trailers have been developed for transporting such boats to bodies of water. Thus, the boats may be stored on land away from the water and docking or mooring facilities are not required. Also a vacationer is enabled to move his boat from one body of water to another as he chooses.

Boat trailers can be roughly divided into two general categories: those having substantially closed hull supporting beds and those having an open frame from which the hull is supported at several separate points by rollers, pads, etc. Examples of trailers having hull supporting, contoured beds are found in U.S. Pat. Nos. 3,224,019; 3,339,217 and 3,528,095 of Gudmundson. A different type of closed bottom trailer for transporting open boats in an inverted condition is disclosed in U.S. Pat. No. 2,792,237 of Paulson, the space between the inside of the boat hull and the closed trailer bed of such trailer being adapted for storing boating and camping gear.

An advantage of hull supporting bed trailers is that a boat being carried on the trailer has its weight distributed over a large supporting area of the hull. Accordingly, the hull is subjected to low stresses. Also, the trailer bed provides protection to at least those supported hull portions from damage due to gravel and stones thrown rearwardly by a towing vehicle's wheels. In addition, as disclosed in the first two above listed patents of Gudmundson, the trailer may be made floatable to function as a floating dry dock.

A principal disadvantage of hull supporting bed trailers, however, is that, to be effective as designed, upper surfaces of the trailer bed must be contoured to watch the curvature of a particular hull size and shape. As a result, the trailer can ordinarily be used for only one particular size and type of boat. Not only is contouring of the trailer bed expensive in itself, but the restricted use of the trailers makes them uneconomical for general use with the almost infinite variety of hull configurations. Thus, such "contourized" trailers are generally limited to use with expensive boats where uniform hull support is desired to prevent possible hull damage, and trailer cost is not a major factor.

As a consequence, for general use open frame trailers having several hull supporting members such as rollers or pads, are the dominant type. Modern boat hulls are generally sufficiently strong and rigid that the several point support is not detrimental. Because a boat hull on the trailer is supported at only a few spaced apart points, a particular model of trailer can usually accommodate a wide variety of boat types with at most only minor adjustment of the supporting members being necessary. This wide adaptability to different types of boats, plus the simple open frame construction, enables economical mass production of the trailers, making them suitable for even relatively inexpensive boats.

Such open trailers have the further advantage of being comparatively light weight, thereby reducing towing loads.

Open frameworks of open trailers also have the advantage of being negligibly buoyant. This is desirable since the normal mode of boat launching and recovery is by backing the trailer down a shallow ramp into the water until it is largely submerged. The boat is then floated from or onto the trailer. Recovery and even launching of boats would be made considerably more difficult if the trailer were buoyant. In such use, open frame trailers also provide few water trapping regions and corrosion problems, particularly in salt water use, are minimized.

On the other hand a disadvantage of open frame trailers is that they provide substantially no protection to the boat hull from rearwardly thrown road debris. This is a major deficiency because roads to many boat launching and recovery areas are not paved and are rough and stony. Thus, hulls of boats transported on open frame trailers become pitted and pock marked. In some cases, actual hull damage results.

Although the Gudmundson U.S. Pat. No. 3,528,095 discloses a hull-contoured panel which can be installed on open frame trailers to support and protect boat hulls, such panels are generally unsatisfactory as gravel deflectors because they do not project sufficiently far forwardly to protect upswept bow portions of the hull. Also they are expensive to make and must be designed for, and limited to, use with a particular hull design as with hull supporting trailer beds.

Accordingly, to correct these and other deficiencies, I have invented an effective gravel deflector which is economical to produce, easy to install and is adaptable for use on many types of open frame trailers and with most hull types and which can be added onto existing trailers.

SUMMARY OF THE INVENTION

In combination with a boat trailer having a generally open frame for receiving the hull of a boat with the bow thereof directed forwardly towards a hitching portion of the trailer, a gravel deflector, for protecting at least forward under portions of a boat hull on the trailer from road debris thrown rearwardly by wheels of a towing vehicle, comprises a deflecting member having major portions thereof substantially flat and adapted for resting against longitudinal beams of the trailer frame and having side edges, along at least a forward side region, converging inwardly towards a transverse forward edge portion, and having a transverse rearward edge portion which is substantially larger than the forward edge portion.

The forward edge portion is inclined upwardly and forwardly, relative to the major flat portion, the converging side edges are inclined upwardly and generally forwardly and outwardly relative to the major flat portion and the rearward edge portion is inclined downwardly and rearwardly relative to the major flat portion. Means are provided for attaching the deflecting member to forward portions of the trailer just rearwardly of the hitching portion in a position to deflect gravel, stones and the like, thrown rearwardly theretowards by wheels of a vehicle towing the trailer, away from a boat carried on the trailer.

Configured in a general trapezoidal shape, as seen from above, the longitudinal length of the deflecting member is no greater than about the length of the rearward edge portion across the deflector and the converging side edges extend between the forward and rearward edge portions. The fastening means is adapted for fastening the deflector member to upper or lower surfaces of the longitudinal frame beams.

The deflector may be differently shaped, for example, extended in longitudinal length, and may be varied in size according to the size and type of trailers and boats with which the deflector is to be used. However, because the deflector is configured and positioned on the trailer frame to be out of engagement with a boat on the trailer, deflector configuration is relatively independent upon the hull configuration of a boat being carried on the trailer and has wide application to many types of boats and trailers, as opposed to having to be custom conformed to a particular trailer and boat combination. Accordingly, the deflectors can be economically mass produced and are adaptable both as add ons for existing trailers and as part of new trailer assembly.

BRIEF DESCRIPTION OF THE DRAWINGS

A better understanding of the present invention may be had from a consideration of the following detailed description, taken in conjunction with the accompanying drawings in which:

FIG. 3 is a plan view of the deflector shown attached to a boat trailer;

FIG. 5 is a transverse sectional view of the deflector taken along line 5—5 of FIG. 3, looking forwardly; and FIG. 6 is a transverse sectional view of the deflector taken along line 6—6 of FIG. 3, looking rearwardly.

DESCRIPTION OF THE PREFERRED EMBODIMENT

Figure 1:
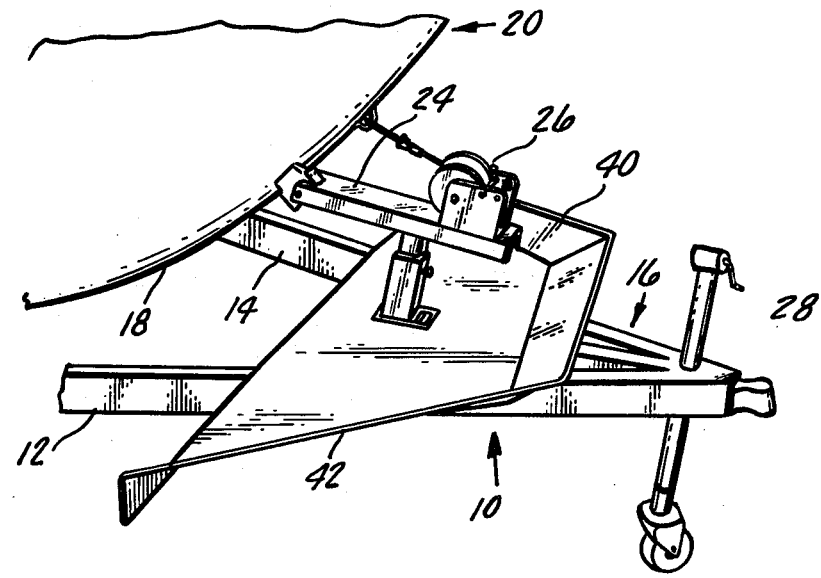
FIG. 1 is a perspective view of a gravel and stone deflector, according to a prefered embodiment, shown attached to a forward portion of a small boat trailer.
Figure 2:
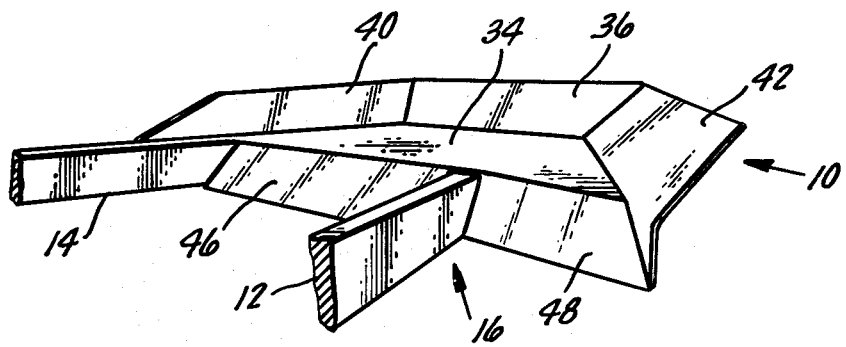
FIG. 2 is another perspective view of the deflector of FIG. 1, looking forwardly at the rear of the deflector.

As seen in FIGS. 1 and 2, a gravel and stone deflector or deflecting member 10 is shown attached to first and second, generally longitudinal frame beams or members 12 and 14 of an open frame boat trailer 16 of a conventional type. Shown also in FIG. 1 is an upswept bow portion 18 of a boat 20 supported on the trailer 16 bow forwardly in a conventional manner for towing. Projecting upwardly from the deflector 10 is a bow stop 24 having fixed thereto a small winch 26, the stop and winch being part of the trailer 16 and fixed to a longitudinal trailer frame member hidden beneath the deflector. A hitching portion 28 of the trailer 16 is shown forwardly of the deflector 10 (FIG. 1).

Looking downwardly (FIG. 3), the deflector 10 is seen to be generally trapazoidal in outline, comprising a generally flat portion 34, a transverse forward edge portion 36, a transverse rearward edge portion 38, a left hand side edge portion 40 and a right hand side edge portion 42, the side edge portions converging inwardly from ends of the rearward edge portion to ends of the shorter forward edge portion. The rearward edge portion 38 is divided into left hand, central and right hand sub portions 44, 46 and 48, respectively by first and second rectangular cutouts 50 and 52 which provide clearance, as described below, for the frame members 12 and 14.

As shown, the size of the deflector 10 is such that the forward edge portion 36 is somewhat longer (in a transverse direction) than spacing between the frame beams 12 and 14 at such forward edge portion upon installation. The rearward edge portion 38 is quite substantially longer than the spacing between the frame beam members 12 and 14 at such rearward edge portion, and is about as long or longer than the longitudinal length of the deflector 10. Thus the side edge portions 40 and 42 are well outboard of the frame beams 12 and 14. In this regard, the deflector 10 is constructed of a size, and is positioned on the frame 16, to project sidewardly and forwardly of a vertical projection 60 (FIG. 3) of the boat bow portion 18.

Effective deflection of gravel, stones, etc. 62 (FIG. 4) thrown rearwardly from the wheels of a towing vehicle (not shown) to which the trailer is hitched is provided by inclining or sloping the deflector edge portions 36, 38, 40 and 42. The forward edge portion 36 is inclined upwardly and forwardly (FIG. 4) at an angle which is preferably, but not necessarily, about 45°. In contrast, the rearward edge portion 38 is inclined downwardly and rearwardly, also at an angle of at least about 45°. The side edge portions 40 and 42 are inclined generally upwardly and both outwardly and forwardly at about the same angle as the forward edge portion 36 (FIGS. 5 and 6). It was previously noted that the deflector portion 34, which is a major portion of the deflector, is substantially flat.

Since the deflector 10 is, as shown, configured to be installed downwardly onto the frame members 12 and 14, the cutouts 50 and 52 in the rearward edge portion 38 are necessary to enable an under surface 64 of the flat portion 36 to rest against upper surfaces of the beams 12 and 14. Positioning of the cutouts 50 and 52 is dictated by the particular configuration of the trailer 16, and preferably the cutouts are not made until such time as the deflector 10 is being installed on the trailer so that they may be made as small as possible to preserve continuity of the rearward edge portion 38, the beams 12 and 14 (or such frame members as a particular trailer with which the deflector is used) closely fitting in the cutouts.

Figure 4:
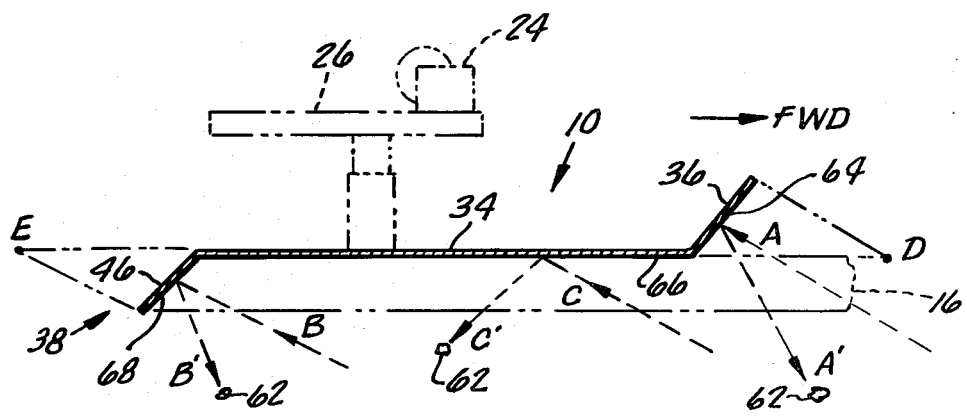
FIG. 4 is a longitudinal sectional view of the deflector taken along line 4—4 of FIG. 3, looking sidewardly from along the longitudinal axis of the deflector and trailer.

Inclining of the edge portions 36, 38, 40 and 42 not only adds rigidity to the deflector 10, but also maximizes gravel and stone deflection for the size of the deflector, and enables the deflector to be made smaller and project less far forwardly, sidwardly and rearwardly than would otherwise be necessary. For effective deflection, the inclined edge portions (36, 38, 40, 42) are about 9–12 inches wide. This effect is illustrated in FIG. 4, which shows gravel or stones 62 impinging on the deflector at different points, a forwardmost stone impinging on a forward side 64 of the inclined forward edge portion 36 in the direction of Arrow A and being deflected away in the direction of Arrow A. Similarly, a rearwardmost stone impinges on a forward surface 68 of the rearward edge portion 38 along the direction of Arrow B and is deflected downwardly along the path of Arrow B. An intermediate stone 62 hits the underside 66 along Arrow C and is deflected along a path shown by Arrow C. In a like manner (not shown), gravel and stones hitting generally forwardly facing surfaces 70 and 72 (FIG. 6) of the side edge portions 40 and 42 respectively, are deflected downwardly and outboard.

By virtue of being inclined in the manner described, the forward and rearward edge portions 36 and 38 effectively extend the deflector 10 forwardly to point D and rearwardly to point E (FIG. 4), distances substantially greater than if such portions were merely flattened out. This has the advantage that the deflector 10 can be made smaller, and hence lighter in weight and less expensive, than a comparable, entirely flat deflector, and has the further advantage that the deflector does not project outwardly as far and hence is safer to use, there being less risk to people launching and recovering the boat 20 of running into the deflector and being injured thereby.

The deflector 10 is preferably constructed of plastic or metal either in a single piece or welded up of several pieces, and is attached to the frame 16, for example, by several bolts 78 (FIG. 3) which pass through the portion 34 and the frame beams 12 and 14. Configuration of the deflector 10 is relatively independent of the size and configuration of the trailer 16 and of the boat 20 with which the trailer is used. Normally no portion of the deflector 10 contacts any part of the boat 20; consequently, there is no need for the deflector to conform in any region to the contour of the hull of the boat.

It is to be appreciated, however, that the deflector 10 may be constructed in different sizes for different sizes of trailers - small deflectors being provided for small trailers and larger deflectors being provided for larger trailers. Though for any size trailer, the hull configuration of the boat 20 is relatively immaterial.

A short fore-aft deflector 10, approximately as shown, being shorter or about as short as the width of the rearward edge portion 38, is generally sufficient to protect the boat from rearwardly thrown gravel and stones. Such gravel and stones are generally not thrown at higher angles requiring the deflector to extend further forwardly. And at shallower thrown angles, gravel and stones which miss this deflector 10 generally also miss the boat 20. Where particular protection is required, the deflector may, however, be made longer to extend further rearwardly.

It is also to be appreciated that the angle of rearward rake or sweep of the side edge portions 40 and 42 is determined at least in part by the necessary or desired turning radius of the combined trailer 16 and the vehicle towing the trailer. As shown, the edge portions extend all the way rearwardly to the rearward edge portion 38; however, on longer deflectors, this is not necessarily the case.

In the manner described, an effective gravel and stone deflector is provided which is adapted to a wide variety of boat trailers, and which can economically be added by owners to existing trailers with a minimum of effort and which can be installed on new trailers during manufacturing thereof.

Although there has been described above a specific arrangement of a gravel and rock deflector apparatus for protecting being transported on trailers in accordance with the invention for the purpose of illustrating the manner in which the invention may be used to advantage, it will be appreciated that the invention is not limited thereto. Accordingly, any and all modifications, variations or equivalent arrangements which may occur to those skilled in the art should be considered to be within the scope of the invention as defined in the appended claims.

What is claimed is:

1. In combination with a boat trailer having a generally open frame for receiving the hull of a boat with the bow thereof directed forwardly towards a hitching portion of the trailer, a gravel deflector for protecting at least forward under portions of a boat hull on the trailer from gravel and stones thrown rearwardly by wheels of a towing vehicle during towing of the trailer and boat, which comprises:

(a) a deflecting member having major portions thereof substantially flat and adapted for resting against longitudinal beams of the trailer frame and having side edge portions thereof, in at least a forward region, converging inwardly towards a transverse forward edge portion, and having a transverse rearward edge portion substantially longer in transverse direction than said forward edge portion, said forward edge portion being inclined upwardly and forwardly relative to said major flat portion, said converging side edge portions being inclined upwardly and generally forwardly and outwardly relative to said major flat portion and said rear edge portion being inclined downwardly and rearwardly relative to said major flat portion, said member being positioned longitudinally such that with said forward edge portion adjacent the hitching portion said rear edge portion lies generally beneath upswept bow portions of the boat carried on the trailer; and (b) means for fastening the deflecting member to forward portions of the trailer just rearwardly of the hitching portion in a position to deflect gravel, stones and the like thrown rearwardly by wheels of a towing vehicle away from a boat carried on the trailer.

2. The deflector according to claim 1, wherein the longitudinal length of the deflecting member is no greater than about the transverse length of the rear edge portion thereof and said converging side edge portions extend between ends of said forward and rearward edge portions so that the deflector member as seen from above is generally trapezoidal in outline.

3. The deflector according to claim 2, wherein the fastening means includes means for fastening said major portion of the deflecting member to upper surfaces of said frame longitudinal beams.

* * * * *